Figure 1:

| United States Patent [19] | [11] Patent Number: 5,061,754 |
| --- | --- |
| Dufour et al. | [45] Date of Patent: Oct. 29, 1991 |

[54] LOW GLOSS POLYCARBONATE/ABS BLENDS

[75] Inventors: Daniel L. Dufour, Waterloo; Jean Pierre, St. Denis, both of Belgium

[73] Assignee: Monsanto Europe S.A., Brussels, Belgium

[21] Appl. No.: 441,599

[22] Filed: Nov. 27, 1989

[30] Foreign Application Priority Data

Dec. 19, 1988 [GB] United Kingdom ............... 8829535

[51] Int. Cl.$^5$ ............................................. C08L 69/00
[52] U.S. Cl. ...................................... 525/67; 525/146
[58] Field of Search ............................................ 525/67

[56] References Cited

U.S. PATENT DOCUMENTS 4,415,692  11/1983  Idel .......................................... 525/67
4,526,926  7/1985  Weber ..................................... 525/67
4,804,708  2/1989  Wittmann ............................... 525/67

*Primary Examiner*—John C. Bleutge
*Assistant Examiner*—David Buttner
*Attorney, Agent, or Firm*—William J. Farrington

[57] ABSTRACT

A polycarbonate composition having present therein particles of rubber grafted with an ethylenically unsaturated aromatic monomer and either acrylonitrile or methacrylonitrile, characterized in that the particles have an average size of from 20 to 300 nm before being blended with the polycarbonate and agglomerate during blending to form aggregates of average size 500 to 10,000 nm, and in that the composition can be injection moulded to produce a moulding wherein the aggregates substantially retain their identity and the moulding has a surface of matt appearance.

7 Claims, 2 Drawing Sheets

1μm

1μm

LOW GLOSS POLYCARBONATE/ABS BLENDS

This invention relates to resin compositions, and particularly to resin compositions comprising polycarbonate and grafted rubber. There have been numerous proposals to blend polycarbonate with grafted rubber such as ABS. The resulting blends (or compositions - the two terms are herein used interchangeably) are of value in applications where a combination of desirable properties such as high tensile and impact strengths, heat resistance, good processability and controllable surface appearance is required. Examples of such applications are in motor vehicle parts and housings for electrical or mechanical equipment.

An investigation of PC/ABS blends and their properties by Chiang et al. is reported in "Polymer Engineering and Science", Mid-May, 1987, Vol. 27, No. 9, pp 632–639.

It is in many instances desirable that articles moulded from the compositions have a matt, or low-gloss, appearance, and various proposals for achieving this result, combined with some or all of the other desirable properties mentioned above, have been made in the past.

U.S. Pat. No. 4,677,162 describes a blend of aromatic polycarbonate, an ABS made by bulk or mass suspension polymerisation of average particle size greater than 0.75 micrometre, and an impact-modifying graft of average particle size less than 0.75 micrometre.

U.S. Pat. No. 4,526,926 describes polycarbonate compositions comprising large polymer particles (e. g. 0.8 to 6 micrometre), which particles give rise to a low gloss on articles moulded from the compositions. The large particles can be of grafted rubber made either by (A) mass, bulk or mass suspension polymerization or (B) by agglomerating or coagulating particles prepared by emulsion polymerization.

U.S. Pat. No. 4,624,986 similarly describes the use of large particle grafted rubber in ensuring low gloss in polycarbonate compositions.

In the prior proposals mentioned above, the matt surface is apparently achieved by the presence of comparatively large particles of grafted rubber, which presumably protrude from the surface of the moulded article on relaxation of the moulding pressure and thus reduce the glossy nature of the polycarbonate surface. These large particles are made by grafting at least part of the rubber by means of a mass or suspension process or by treating a fine-particle latex by a coagulation or agglomeration step; such methods are expensive and it would be desirable to avoid them.

EP-A-244,856 describes compositions of polycarbonate, a grafted rubber and styrene/acrylonitrile polymer, the grafted rubber comprising both particles of average size 200 to 700 nm (0.2 to 0.7 micrometre) and particles of average size 50 to 180 nm (0.05 to 0.18 micrometre). In Examples, the first grafted rubber is made by a two stage grafting polymerisation.

There has now been discovered a remarkable phenomenon by means of which a fine-particle grafted rubber can be used to produce polycarbonate compositions, having the desirable physical properties (including particularly impact strength) mentioned above, that can be used to produce matt surfaced mouldings. It has been found that if the composition of the grafted rubber is so chosen that it has the right degree of semicompatibility with the polycarbonate, its particles agglomerate spontaneously during the blending operation and the resulting blend has a low gloss when moulded. The particles should be sufficiently incompatible with the polycarbonate to give the desired improvement in impact strength, but on the other hand they should not be so incompatible that no aggregates are formed or the aggregates are broken up when the composition is injection-moulded.

Thus, a new class of blends of this kind has been developed, these blends being easily made and possessing a surprising combination of properties. In particular, they have a low surface gloss when injection moulded, are of good impact strength and are moreover readily processed without loss of these desirable properties.

Figure 2:
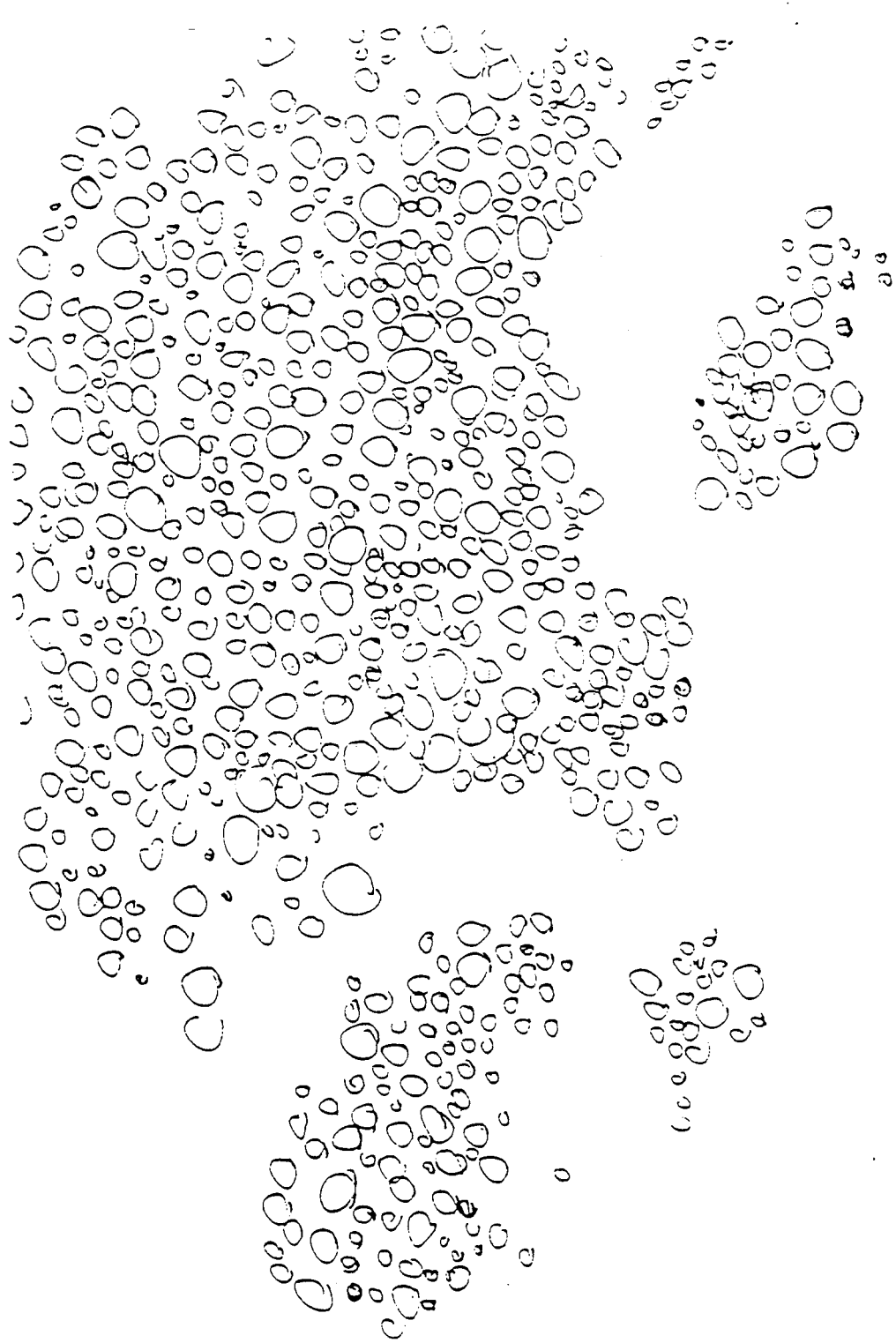

In the accompanying Drawings, FIG. 1 is prepared from an electron microscope photograph showing agglomerated ABS particles in a polycarbonate matrix in a composition according to the invention;

FIG. 2 shows similar agglomerated particles on a larger scale than in FIG. 1.

The polycarbonate composition of the invention is one having impact strength improved by means of the presence therein of particles of rubber grafted with an ethylenically unsaturated vinylaromatic monomer and either acrylonitrile or methacrylonitrile, characterised in that the particles have an average size of from 20 to 300 nm before being blended with the polycarbonate and agglomerate during blending to form aggregates of average size 500 to 10,000 nm, and in that the composition can be injection moulded to produce a moulding wherein the aggregates substantially retain their identity and the moulding has a surface of matt appearance.

As mentioned above, agglomeration of the grafted rubber particles is achieved by an appropriate choice of semicompatibility between the grafted rubber and the polycarbonate. It has been found that the major factors influencing the degree of semicompatibility are:

(a) The chemical nature of the polycarbonate.
(b) The chemical nature of the grafted monomer or monomers.
(c) The level of grafting.
(d) The chemical nature of the substrate rubber particles.
(e) The relative proportions of PC and ABS in the blend.
(f) The presence or absence of other components in the blend, such as for example SAN (styrene acrylonitrile) copolymer.

These are discussed individually below.

The chemical nature of the polycarbonate naturally has a strong effect on the degree of incompatibility, but the polycarbonate is usually chosen to satisfy other criteria, in particular its physical properties such as strength, resistance to light and so on, and therefore it is usually most convenient to achieve the desired degree of incompatibility with a given polycarbonate by means of the other controlling factors mentioned above and discussed in more detail below. In general, any of the classes of polycarbonates mentioned in the prior art patents, for example U.S. Pat. No. 4,624,986 or EP-B-174,503, can be used in the composition of the invention. Preferably one employs a polycarbonate containing residues of a bisphenol such as 2,2-bis(4-hydroxyphenyl)-propane.

One of the more important variables determining the degree of incompatibility is the composition of the grafting polymer. The preferred grafting polymer is a copolymer of styrene and acrylonitrile (SAN), preferably containing 20% to 35% of acrylonitrile AN (by weight based on SAN). The styrene can be wholly or partially replaced by one or more other aromatic monomers such as for instance vinyltoluene, chlorostyrene or methylchlorostyrene or by alphamethylstyrene. Preferably the aromatic monomer is a vinylaromatic hydrocarbon. The acrylonitrile can be wholly or partly replaced by methacrylonitrile if desired. There may also be present an additional monomer such as methyl methacrylate or maleic anhydride. For the preferred system of styrene and acrylonitrile SAN, the proportion of acrylonitrile may conveniently be close to 28% by weight based on the combined weights of styrene and acrylonitrile, but small variations around this figure can have a profound effect on compatibility and some experimentation may be necessary in order to obtain the best result.

The level of grafting of the polymer chains on the rubber (that is to say the percentage of graft polymer versus rubber level) can also affect the degree of compatibility with the polycarbonate, particularly at lower levels of grafting, for example 20 to 120% preferably 25 to 100%. Within this range, reducing the level of grafting reduces compatibility and increasing the level of grafting increases compatibility. The lower limit is set by the need to give the desired impact strength to the composition.

A preferred grafted rubber is one in which 100 parts by weight comprise 50 to 60 parts by weight of polybutadiene grafted with 50 to 40 parts by weight of styrene and acrylonitrile in a weight ratio 70/30 to 75/25.

The chemical nature of the substrate rubber particle can also affect compatibility but more noticeably so when only lightly grafted, that is to say when the level of grafting is for example 20 to 40%. Thus the presence of polar (e.g. nitrile) groups in the rubber can increase compatibility, and the presence of styrene will decrease the compatibility. Very often, as with the polycarbonate, it is desirable to choose the rubber for reasons other than achieving the desired degree of compatibility according to the present invention, and then to achieve the latter by suitable choice of grafting polymer. Examples of suitable rubbers are: polybutadiene, styrene/butadiene copolymer rubber, and acrylonitrile/butadiene copolymer rubber.

It is preferred that the blend contain from 50 to 85%, preferably to 60 to 80%, of polycarbonate and correspondingly from 50 to 15%, preferably 40 to 20%, of grafted rubber based on the combined weight of PC and grafted rubber.

The unagglomerated grafted rubber particles are of number average size 20 to 300 nm, preferably 50 to 200 nm and more preferably 20 to 150 nm. These measurements are determined by transmission electron microscopy. The rubber particules are stained with osmium tetraoxide OsO$_4$. The diameters of the particules are measured on the picture and averaged for a certain area, knowing the magnification used in the transmission microscopy experiment.

The agglomerates that form in the course of the blending operation have an average particle size 400 to 10,000 nm, preferably 600 to 7000 nm, and more preferably 800 to 5000 nm.

It is an important aspect of the invention that the compositions are easily processable, for example by injection moulding, without breaking up the aggregates of grafted rubber particles, and an important factor in ensuring this is the correct degree of semicompatibility with the polycarbonate as described above.

The presence of larger particles of grafted rubber (e.g. 1000 to 5000 nm) is not necessary to achieve the desired matt appearance, although some such larger particles may be present for other reasons, for example to achieve a given degree of impact strength. Generally, the number of such larger particles necessary for such purposes is much smaller than the number that would be required to achieve low gloss according to the prior proposals mentioned above; thus, for example, the amount of any such large-particle grafted rubber is not usually more than 20% of the grafted rubber in the composition.

The blend can contain additives normally employed in polymer compositions of this kind, including for example lubricants, stabilisers, antioxidants, colouring agents, etc.

EXAMPLES

The invention is illustrated by the following Examples, in which all proportions are by weight unless otherwise stated.

MATERIALS

The materials used in the Examples were as follows:

Polycarbonate

LEXAN ®125 a commercial powder-form injection moulding grade of polycarbonate having a number-average molecular weight of 10,000 and weight-average molecular weight of 23,000, sold by GE Plastics Europe.

Grafted Rubbers

A. 82% Elastomer phase and 18% rigid phase.

The elastomer phase consisted of 57% backbone of 90% butadiene and 10% styrene, grafted with 43% of styrene and acrylonitrile in a weight ratio of 72/28. Rubber particle size 100 nm (number average diameter). The rigid phase consisted of 72% of styrene copolymerised with 28% acrylonitrile. Molecular weight of the rigid phase are Mn $29 \times 10^3$, Mw $85 \times 10^3$ and Mz $188 \times 10^3$.

B. 58% Elastomer phase and 42% rigid phase.

The elastomer phase consisted of 73% backbone of 92% butadiene and 8% acrylonitrile, grafted with styrene and acrylonitrile in a weight ratio of 72/28. Rubber particle size 170 nm (number average diameter). The rigid phase consisted of 73% of styrene copolymerised with 27% of acrylonitrile. Molecular weights of the rigid phase are Mn $29 \times 10^3$, Mw $92 \times 10^3$ and Mz $303 \times 10^3$.

C. 27% Elastomer phase and 73% rigid phase.

The elastomer phase consisted of 55% backbone of 100% polybutadiene, grafted with 45% of styrene and acrylonitrile in a weight ratio of 69/31. Rubber particle size 2-20 microns. The rigid phase consisted of 73.7% of styrene copolymerised with 26.3% acrylonitrile.

| | |
|---|---|
| ACRAWAX ® and comprising | Lubricant sold by Unichema Ethyl bistearamide. |
| IRGANOX ® 1076 and comprising | Antioxidant sold by Ciba Geigy octyldecyl 3'(3,5 ditertiary butyl-4-hydroxyphenyl)propionate |
| POLYGARD ® and comprising | sold by Uniroyal nonyl phenyl phosphite |
| KRONOS ® CL220 | Titanium dioxide sold by Kronos |

| | |
|---|---|
| Carbon black | Titan GmbH. from Cabot. |

PHYSICAL TESTING

The following test methods were employed.

| | |
|---|---|
| MELT FLOW INDEX | Method described in ISO 1133, at 240° under a 5 kg weight. Results reported in g/10 minutes. |
| GLOSS | Method described in ASTM D523 at 20° and 60° angles. Results reported in % of light reflected. |
| VICAT SOFTENING POINT | Method described in ISO 306 using 1 kg and 5 kg weights. Results reported in °C. |
| IMPACT STRENGTH | (a) Notched Izod, method described in ISO 180. Results reported in J/m. (b) Multiaxial impact. Driven dart having a tip radius of 2 cm. Dart speed 1 m/sec., sample size 10 cm × 7,5 cm × 0,25 cm. Results reported in J. |

Compositions as shown in Table I below were compounded in a Banbury internal mixer after drying the components for 4 hours at 90° C.

TABLE I

| Component | Parts by weight |
|---|---|
| Polycarbonate | * |
| Grafted rubber | * |
| ACRAWAX ® | 0.3 |
| IRGANOX ® 1076 | 0.15 |
| POLYGARD ® | 0.15 |
| KRONOS ® CL 220 | 2.0 |
| Carbon black | 0.015 |

*For amounts, see Tables III and VI. Total equals 100.

The pellets obtained were injection moulded to form test bars using a Boy moulding machine under the conditions shown in Table II. Note that appropriately higher temperatures were used to mould the control Example where no grafted rubber was present.

TABLE II

| Injection moulding conditions. | | |
|---|---|---|
| | Polycarbonate/ grafted rubber | Polycarbonate alone |
| Temperature profile | | |
| Barrel T1 (°C.) | 250 | 290 |
| T2 (°C.) | 260 | 300 |
| T3 (°C.) | 270 | 300 |
| Nozzle (°C.) | 270 | 300 |
| Melt Temp. (°C.) | 265-270 | 300 |
| Mould Temp. (°C.) | 90 | 100 |
| Screw Speed (RPM) | 150 | 150 |
| Injection Speed | Slow | Slow |

TABLE III

Results:

PC/ABS Blends (80:20)

| | Example Number | | | | | | | | |
|---|---|---|---|---|---|---|---|---|---|
| | 1 | 2 | 3 | 4 | 5 | 6 | 7 | 8 | 9 |
| Polycarbonate | 80 | 80 | 80 | 80 | 80 | 80 | 80 | 80 | 100* |
| Grafted Rubber A | 20 | 15 | 8 | 12 | — | — | — | — | — |
| Grafted Rubber B | — | 5 | 12 | — | — | 5 | 12 | 20 | — |
| Grafted Rubber C | — | — | — | 8 | 20 | 15 | 8 | — | — |
| MFI (g/10 Min.) 240° C., 5 Kg | 3,2 | 3,9 | 2,9 | 5,3 | 5,7 | 4,7 | 3,7 | 3,1 | Not* measured |
| Gloss % | | | | | | | | | |
| × 20° | 27 | 37 | 39 | 41 | 53 | 61 | 64 | 51 | >>* |
| × 60° | 62 | 76 | 81 | 72 | 90 | 92 | 92 | 85 | >>* |
| Vicat Sp (°C.) | | | | | | | | | |
| 1 Kg | 139 | 139 | 140 | 139 | 140 | 140 | 139 | 140 | 150 |
| 5 Kg | 131 | 131 | 132 | 130 | 132 | 132 | 132 | 133 | 145 |
| Notched Izod Impact (J/m) | 489 | 519 | 600 | 510 | 665 | 697 | 696 | 637 | 735 |
| Multiaxial Impact (J) | >170 | >170 | >170 | >170 | >170 | >170 | >170 | >170 | >170 |
| Appearance of particles in electron microscope | LA | LA | LA | LA LP | LP | SA LP | SA LP | SA | — |

| | Example Number | | | | | | |
|---|---|---|---|---|---|---|---|
| | 10 | 11 | 12 | 13 | 14 | 15 | 16 |
| Polycarbonate | 60 | 60 | 60 | 60 | 60 | 60 | 100** |
| Grafted Rubber A | 40 | — | — | 20 | 20 | — | — |
| Grafted Rubber B | — | 40 | — | 20 | — | 20 | — |
| Grafted Rubber C | — | — | 40 | — | 20 | — | — |
| MFI (g/10 Min.) 240° C., 5 Kg | 2,9 | 1,7 | 6,3 | 1,2 | 3,6 | 3,6 | |
| Gloss % | | | | | | | |
| × 20° | 51 | 86 | 61 | 81 | 58 | 54 | 100** |
| × 60° | 87 | 97 | 93 | 97 | 92 | 90 | 100 |
| Vicat Sp (°C.) | | | | | | | |
| 1 Kg | 133 | 136 | 134 | 135 | 133 | 135 | 144 |
| 5 Kg | 114 | 119 | 119 | 116 | 118 | 119 | 139 |
| Notched Izod Impact (J/m) | 388 | 589 | 618 | 522 | 520 | 674 | 81 |
| Multiaxial Impact (J) | 156 | >170 | >170 | >170 | >170 | >170 | >170 |
| Appearance of | LA | SA | LP | LA | SA | SA | — |

TABLE III-continued

Results:

PC/ABS Blends (80:20)

| particles in electron microscope | SA | LP | LP | — |
|---|---|---|---|---|

*Transparent (natural) product. No pigment.
**Grey pigmented formation (2 phr TiO$_2$ + 0.015 phr Carbon black)
LA = Large rubber agglomerates > 800 nm.
SA = Small rubber agglomerates < 400 nm.
LP = Large rubber particles > 1000 nm.

The results shown in Table III a IV demonstrate the advantages of the invention.

and the relative compatibility. The glass transition temperature were measured by DSC analysis.

| | Examples | | | | | | | | |
|---|---|---|---|---|---|---|---|---|---|
| | A | B | C | D | E | F | G | H | I |
| Polycarbonate | 100 | — | — | 90 | 90 | 80 | 80 | 60 | 60 |
| Grafted Rubber A | — | 100 | — | 10 | — | 20 | — | 40 | — |
| Grafted Rubber B | — | — | 100 | — | 10 | — | 20 | — | 40 |
| Glass transition temperature of Tg$_1$ | 138 | 103 | 105 | 136 | 137 | 135 | 137 | 134 | 136 |
| the rigid phase Tg2 | — | — | — | — | — | — | 106.5 | 106 | 108 |

Example 9 and 16 show the properties of pure polycarbonate transparent or pigmented for comparison. In Table III, Examples 1 to 8 illustrate the gloss level obtained at 80% polycarbonate. Examples 1 to 4 are in accordance with the invention and Examples 5 to 9 are for comparative purposes. Example 1 using only a grafted rubber ABS as described by the invention shows how low the gloss is reduced through agglomeration of particle to a level of 1000–2000 nm. In comparison Example 5 using large rubber particle ABS of about 5000 nm does not present such a low gloss. Example 8 based on ordinary grafted, rubber ABS giving a small level of agglomeration does not have the low level of gloss. Examples 2 and 3 illustrate how the balance impact/glass can be adjusted by replacing the special ABS by ordinary small rubber particle ABS giving higher impact and higher gloss. Example 4 illustrates how a compromise can be achieved between flow, impact and gloss by replacing part of the special ABS with the high-flow large rubber particle ABS. Examples 6 and 7 indicate that mixtures of large rubber particle ABS and ordinary small particle ABS give a good impact but a mediocre low gloss effect at this polycarbonate level.

Examples 10 to 15 illustrate the gloss level obtained at 60% polycarbonate level.

Example 10 is in accordance with the invention. To obtain a low gloss effect at this level of polycarbonate the known solution is to use large rubber particles as illustrated by Example 12 or a mixture of large and small particles as illustrated by Example 15. The level of gloss at 20% is 61% or 54%. If only small particles are used, the gloss level is 86% as in Example 11. By using the special ABS, Example 10, the gloss level is only 51%.

The special ABS can be blended with either ordinary small particle ABS or large particle ABS. However the ratio between the special ABS and the other ones should not be too small in order to get the low-gloss effect. At 60% polycarbonate a 50/50 ratio with ordinary ABS shows only a small improvement versus 100% ordinary ABS (Examples 13 and 18) and a 50/50 ratio special ABS/large particle ABS, does not present any interest versus a 50/50 ordinary ABS/large particle ABS (Examples 14 and 15).

Using the formulation of Table I samples were prepared to determine the glass transition temperature (Tg)

If the components of the rigid phase are compatible the system is expected to display only one glass transition temperature located between the glass transition temperatures of the pure polymers. Based on the results above, the SAN phase of the grafted rubber B is less compatible than the SAN phase of the grafted rubber A, since at a ratio 80/20 two Tg's exist for grafted rubber B and only one for grafted rubber A. In addition, Tg$_1$ of sample F is more depressed than for sample C, confirming this compatibility. On the contrary the rubber phase of grafted rubber A containing styrene is less compatible with polycarbonate than is the rubber phase of grafted rubber B containing acrylonitrile. The result is that for grafted rubber A, the SAN rigid phase is dissolved in polycarbonate and the rubber pushed in a secondary phase where it has a tendency to agglomerate. For the grafted rubber B, the SAN rigid phase is not fully dissolved in polycarbonate and covers the rubber with a coating that prevents agglomeration. At 60/40 with grafted rubber A, two rigid phases exist giving less rubber agglomeration and a gloss equivalent to the one obtained with grafted rubber B at a ratio 80/20 (see examples 10 and 8).

We claim:

1. A composition obtained by melt blending from 50 to 85% by weight of a polycarbonate and from 50 to 15% by weight of a grafted rubber component having an average rubber particle size in the range of from 20 to 300 nm and which comprises (a) 50 to 60 parts by weight of a polybutadiene rubber grafted with 50 to 40 parts by weight of a styrene monomer and a (meth)acrylonitrile monomer in a weight ratio of styrene/(meth)acrylonitrile of from 70/30 to 75/25, and (b) an ungrafted styrene (meth)acrylonitrile rigid phase polymer present in amounts which will substantially dissolve in the polycarbonate during melt blending wherein the average rubber particle size of the grafted polybutadiene rubber in the melt blended composition is in the range of from 500 to 10,000 nm and wherein the gloss levels of the blend at 60° is about 81% or less as determined by ASTM D523.

2. The composition of claim 1 wherein the rubber component has an average rubber particle size of from 50 to 200 nm before melt blending.

3. The composition of claim 1 wherein the average rubber particle size in the melt blending composition is from 600 to 7000 nm.

4. The composition of claim 1 wherein the polycarbonate is a polycarbonate of bisphenol A.

5. The composition of claim 1 wherein the rubber is a polymer of butadiene and styrene.

6. The composition of claim 1 wherein the butadiene styrene rubber is grafted with styrene and acrylonitrile.

7. The composition of claim 1 wherein the blend contains from 60 to 80% of polycarbonate and correspondingly 40 to 20% of the grafted rubber component.

* * * * *